US011873723B2

(12) United States Patent
Fujimura et al.

(10) Patent No.: US 11,873,723 B2
(45) Date of Patent: Jan. 16, 2024

(54) STEAM TURBINE PLANT AND METHOD FOR CLEANING SAME

(71) Applicant: MITSUBISHI HEAVY INDUSTRIES, LTD., Tokyo (JP)

(72) Inventors: Daiki Fujimura, Yokohama (JP); Takafumi Niwa, Yokohama (JP); Ayumu Kuroshima, Yokohama (JP); Motohiro Goshima, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/024,890

(22) PCT Filed: Jul. 19, 2021

(86) PCT No.: PCT/JP2021/027024
§ 371 (c)(1),
(2) Date: Mar. 6, 2023

(87) PCT Pub. No.: WO2022/059331
PCT Pub. Date: Mar. 24, 2022

(65) Prior Publication Data
US 2023/0313703 A1 Oct. 5, 2023

(30) Foreign Application Priority Data
Sep. 18, 2020 (JP) ................................. 2020-157199

(51) Int. Cl.
*F01D 25/00* (2006.01)
*F01D 25/32* (2006.01)

(52) U.S. Cl.
CPC ........... *F01D 25/002* (2013.01); *F01D 25/32* (2013.01); *F05D 2220/31* (2013.01); *F05D 2260/606* (2013.01); *F05D 2260/607* (2013.01)

(58) Field of Classification Search
CPC ........ F01D 25/002; F01D 25/32; F01D 17/12; F01D 25/00; F05D 2220/31; F05D 2260/606; F05D 2260/607
(Continued)

(56) References Cited

U.S. PATENT DOCUMENTS 3,953,966 A * 5/1976 Martz ..................... F01K 13/02
60/773
4,833,171 A * 5/1989 Sweeney ................... C01B 3/36
518/703
(Continued)

FOREIGN PATENT DOCUMENTS

JP 5-38302 5/1993
JP 2004-226026 8/2004
(Continued)

OTHER PUBLICATIONS

International Search Report dated Sep. 21, 2021 in corresponding International (PCT) Patent Application No. PCT/JP2021/027024, with English language translation.
Written Opinion dated Sep. 21, 2021 in corresponding International (PCT) Patent Application No. PCT/JP2021/027024, with English language translation.

*Primary Examiner* — Hoang M Nguyen
(74) *Attorney, Agent, or Firm* — Wenderoth, Lind & Ponack, L.L.P.

(57) ABSTRACT

This steam turbine plant comprises: a boiler; a steam turbine; a condenser; a condensate pump; a main steam line that is capable of guiding, to the steam turbine, steam generated in the boiler; a bypass line that is branched from the main steam line and is connected to the condenser; a condensate line that is capable of guiding, to the condensate pump, water in the condenser; a condensate outlet valve that is provided in the condensate line; a water supply line that is capable of guiding, to the boiler, water having a pressure
(Continued)

which has been increased in the condensate pump; a first connection unit that is, in the condensate line, branched from a position which is closer to the condenser than the condensate outlet valve is; and a second connection unit that is, in the condensate line, branched from a position which is closer to the condensate pump than the condensate outlet valve is. The first connection unit has a first connection seating that is connectable with a first line. The second connection unit has a second connection seating that is connectable with a second line.

15 Claims, 4 Drawing Sheets

(58) Field of Classification Search
USPC .................................................... 60/646, 657
See application file for complete search history.

(56) References Cited

U.S. PATENT DOCUMENTS

| | | | | |
|---|---|---|---|---|
| 6,910,335 | B2 * | 6/2005 | Viteri ...................... | F23L 7/005 60/656 |
| 2006/0010869 | A1 * | 1/2006 | Blangetti .................. | F28B 9/10 60/646 |
| 2017/0211414 | A1 | 7/2017 | Fujimura et al. | |
| 2017/0362955 | A1 | 12/2017 | Fujimura et al. | |
| 2021/0095572 | A1 * | 4/2021 | Fujimura .............. | F01K 23/101 |

FOREIGN PATENT DOCUMENTS

| | | |
|---|---|---|
| JP | 2016-89656 | 5/2016 |
| JP | 2016-142211 | 8/2016 |

* cited by examiner

STEAM TURBINE PLANT AND METHOD FOR CLEANING SAME

TECHNICAL FIELD

The present disclosure relates to a steam turbine plant including a boiler and a steam turbine, and a method for cleaning the same.

Priority is claimed on Japanese Patent Application No. 2020-157199, filed on Sep. 18, 2020, the content of which is incorporated herein by reference.

BACKGROUND ART

A steam turbine plant generally includes a boiler, a steam turbine driven by steam from the boiler, a condenser that converts the steam exhausted from the steam turbine to water, various pumps such as a condensate pump and a water supply pump, a main steam line that guides the steam generated in the boiler to the steam turbine, a steam stop valve provided in the main steam line, a water line that guides the water inside the condenser to the boiler via the condensate pump or the water supply pump, a bypass line branched from a position on the boiler side from the steam stop valve in the main steam line and connected to the condenser, and a bypass valve provided in the bypass line.

After the steam turbine plant is constructed or after the steam turbine plant is repaired, foreign substances such as welding slag and grinding debris remain inside pipes or inside various devices. Therefore, in the steam turbine plant as described above, blowing-out (or flushing) is performed to remove foreign substances after the steam turbine plant is constructed or repaired.

For example, a method for cleaning the steam turbine plant is disclosed in PTL 1 below.

In the cleaning method disclosed in PTL 1, a temporary pipe is installed before the blowing-out is performed. One end of the temporary pipe is connected to the bypass valve, and the other end of the temporary pipe is connected to a discharge pipe via various lines. Next, the steam is generated in the boiler, and the steam is discharged from the discharge pipe to the atmosphere via the main steam line, the bypass line, the bypass valve, the temporary pipe, and various lines. That is, during the blowing-out, the steam generated in the boiler is discharged to the atmosphere via the temporary pipe without flowing into the steam turbine. In this manner, the foreign substances remaining inside the pipe are discharged to the atmosphere together with the steam.

CITATION LIST

Patent Literature

[PTL 1] Japanese Unexamined Patent Application Publication No. 2016-089656

SUMMARY OF INVENTION

Technical Problem

According to the technique disclosed in PTL 1, the foreign substances remaining inside the pipe are discharged to the atmosphere together with the steam. Consequently, there is a problem in that surroundings of the plant are contaminated accompanied by noise when the steam is discharged to the atmosphere.

Therefore, an object of the present disclosure is to provide a steam turbine plant and a method for cleaning the same, which can reduce contamination and noise around a plant.

Solution to Problem

As an aspect for achieving the above-described object, there is provided a steam turbine plant including a boiler configured to generate steam, a steam turbine configured to be driven by the steam from the boiler, a condenser configured to convert the steam exhausted from the steam turbine to water, a condensate pump configured to raise a pressure of the water from the condenser, a main steam line configured to guide the steam generated in the boiler to the steam turbine, a steam stop valve provided in the main steam line and configured to stop an inflow of the steam into the steam turbine, a bypass line branched from a position closer to the boiler than the steam stop valve in the main steam line is and connected to the condenser, a bypass valve provided in the bypass line, a condensate line configured to guide the water inside the condenser to the condensate pump, a condensate outlet valve provided in the condensate line, a water supply line configured to guide the water whose pressure is raised by the condensate pump to the boiler, and a pure water supply apparatus. The pure water supply apparatus includes a pure water tank configured to store pure water, a pure water line configured to guide the pure water inside the pure water tank to the condenser, a pure water pump provided in the pure water line, and a pure water control valve provided closer to the condenser than the pure water pump in the pure water line is. The steam turbine plant further includes a first connection unit branched from a position closer to the condenser than the condensate outlet valve in the condensate line is, a second connection unit branched from a position closer to the condensate pump than the condensate outlet valve in the condensate line is, and a third connection unit branched from a position closer to the condenser than the pure water pump is and closer to the pure water tank than the pure water control valve in the pure water line is. The first connection unit has a first connection seat connectable to a first line. The second connection unit has a second connection seat connectable to a second line. The third connection unit has a third connection seat connectable to the second line.

In the steam turbine plant of the present aspect, when blowing-out is performed, the condensate pump is driven in a state where the steam stop valve, the bypass valve, and the condensate outlet valve are closed, and the pure water is supplied to the condensate pump from the second connection unit. As a result, the pure water flows into the boiler via the water supply line. The steam flowing into the boiler flows into the condenser via a portion of the main steam line and the bypass line. The steam is converted to water inside the condenser, and is accumulated inside the condenser. The water accumulated inside the condenser is discharged from the condensate line and the first connection unit, and is recovered in a container such as a tank. In this way, in the steam turbine plant of the present aspect, the steam containing foreign substances can be converted to water, and thereafter, can be recovered in the container. Therefore, contamination and noise around the plant can be reduced.

In addition, in the steam turbine plant of the present aspect, the pure water inside the pure water tank can be supplied to the condensate pump by connecting the second connection seat and the third connection seat to the second line. Moreover, in the steam turbine plant of the present embodiment, each of the first connection unit, the second connection unit, and the third connection unit has the connection seat. Therefore, lines can be easily connected to the connection units.

As an aspect of achieving the above-described object, a method for cleaning a steam turbine plant is applicable to the following steam turbine plant.

The steam turbine plant includes a boiler configured to generate steam, a steam turbine configured to be driven by the steam from the boiler, a condenser configured to convert the steam exhausted from the steam turbine to water, a condensate pump configured to raise a pressure of the water from the condenser, a main steam line configured to guide the steam generated in the boiler to the steam turbine, a steam stop valve provided in the main steam line and configured to stop an inflow of the steam into the steam turbine, a bypass line branched from a position closer to the boiler than the steam stop valve in the main steam line is and connected to the condenser, a bypass valve provided in the bypass line, a condensate line configured to guide the water inside the condenser to the condensate pump, a condensate outlet valve provided in the condensate line, a water supply line configured to guide the water whose pressure is raised by the condensate pump to the boiler, and a pure water supply apparatus including a pure water tank configured to store pure water, and configured to supply the pure water inside the pure water tank into the condenser.

In the cleaning method, a preparation step and a blowing-out step are performed. The preparation step includes a blowing water recovery apparatus installation step of connecting a blowing water recovery apparatus having a blowing water tank configured to temporarily store the water from the condenser at a position closer to the condenser than the condensate outlet valve in the condensate line is, and a temporary pure water line connection step of connecting a temporary pure water line to feed the water inside the pure water tank, at a position closer to the condensate pump than the condensate outlet valve in the condensate line is. The blowing-out step includes a blowing-out line setting step of closing the steam stop valve and the condensate outlet valve and opening the bypass valve, a pure water supply step of supplying the pure water inside the pure water tank to the boiler via the temporary pure water line, the condensate pump, and the water supply line, a steam supply step of generating the steam by heating the pure water supplied to the boiler in the pure water supply step inside the boiler, guiding the steam generated in the boiler to the condenser via the main steam line and the bypass line, and converting the steam guided to the condenser to water inside the condenser, and a blowing water recovery step of feeding the water accumulated inside the condenser in the steam supply step to the blowing water tank.

In the present aspect, in the pure water supply step in the blowing-out step, the pure water inside the pure water tank is supplied to the boiler via the temporary pure water line, the condensate pump, and the water supply line. In the steam supply step in the blowing-out step, the pure water is heated inside the boiler to generate the steam. The steam is guided to a condenser via the main steam line and the bypass line, and is guided to the condenser. The steam guided to the condenser is converted to water inside the condenser. In the blowing water recovery step in the blowing-out step, the water accumulated inside the condenser is fed to the blowing water tank. In this way, in the present aspect, the steam containing the foreign substances is converted to water, and thereafter, is recovered in the blowing water tank. Therefore, contamination and noise around the plant can be reduced.

Advantageous Effects of Invention

In an aspect of the present disclosure, while the blowing-out is performed, the steam containing the foreign substances can be converted to water, and thereafter, can be recovered in the container. Therefore, contamination and noise around the plant can be reduced.

DESCRIPTION OF EMBODIMENTS

Hereinafter, embodiments of a steam turbine plant and a method for cleaning same according to the present disclosure will be described.

[Steam Turbine Plant]

The steam turbine plant of the present embodiment will be described with reference to FIGS. 1 to 3. The steam turbine plant of the present embodiment includes a permanent section and a temporary section.

Figure 1:
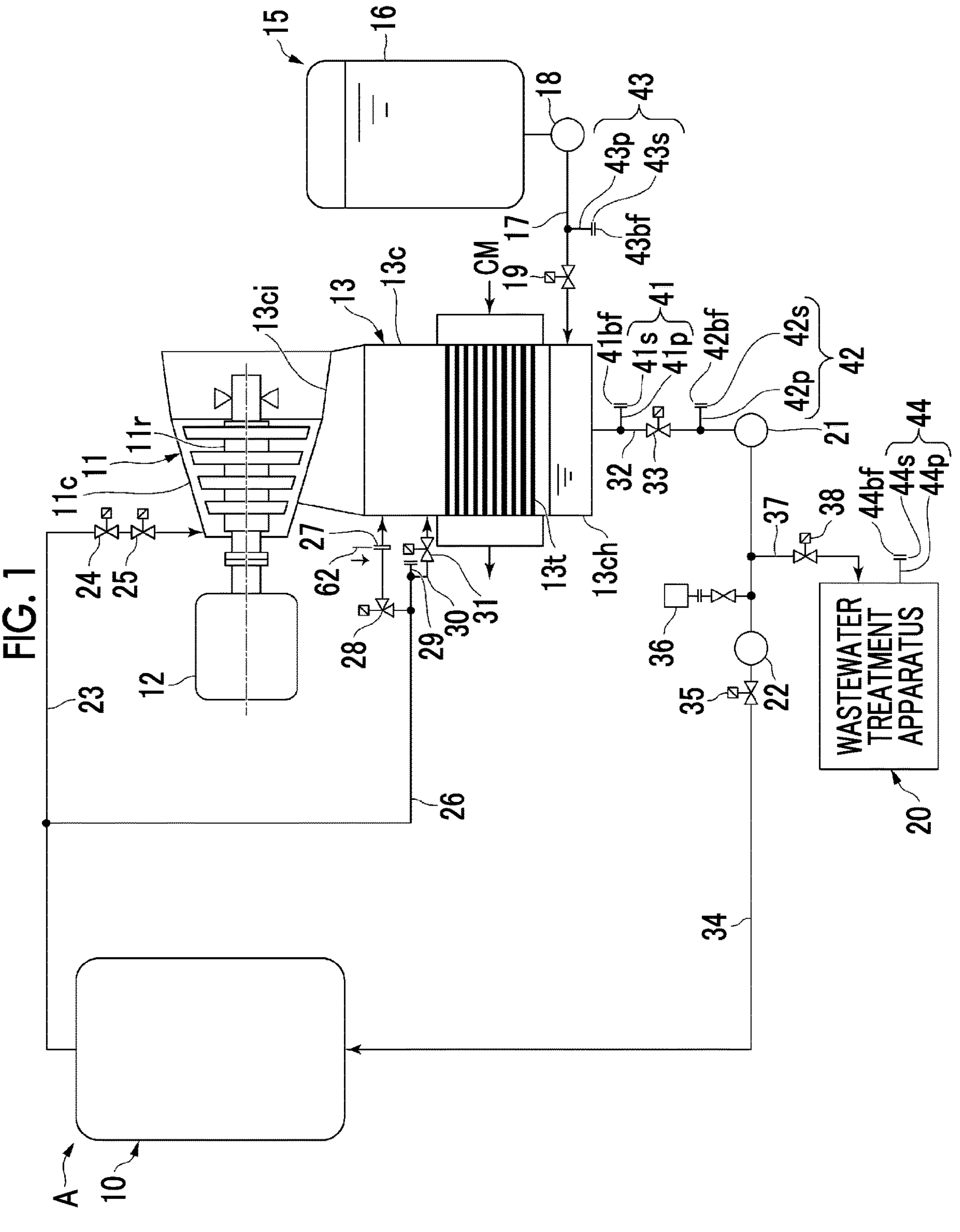
FIG. 1 is a system diagram of a permanent section of a steam turbine plant according to an embodiment of the present disclosure.

As illustrated in FIG. 1, a permanent section A of the steam turbine plant includes a boiler 10, a steam turbine 11, a condenser 13, a pure water supply apparatus 15, a wastewater treatment apparatus 20, a condensate pump 21, a water supply pump 22, a main steam line 23, a steam stop valve 24, a steam control valve 25, a bypass line 26, a bypass valve 28, an inertial filter 29, a bypass steam blow line 30, a bypass steam blow valve 31, a condensate line 32, a condensate outlet valve 33, a water supply line 34, a water supply control valve 35, a water quality detector 36, a water supply blow line 37, and a water supply blow valve 38.

The boiler 10 can heat water to generate steam. The steam turbine 11 has a turbine rotor 11*r* and a turbine casing 11*c* that covers the turbine rotor 11*r*. The steam from the boiler 10 flows into the turbine casing 11*c*. The turbine rotor 11*r* is rotated by the steam flowing into the turbine casing 11*c*. For example, a rotor of a generator 12 is connected to the turbine rotor 11*r*.

The condenser 13 has a condenser casing 13*c* and a heat transfer pipe group 13*t* disposed inside the condenser casing 13*c* and configured to include a plurality of heat transfer pipes. The condenser casing 13*c* has a steam inlet opening 13*ci* that guides the steam exhausted from the steam turbine 11 to an inside of the condenser casing 13*c* itself. A cooling medium CM for cooling the steam exhausted from the steam turbine 11 flows through the plurality of heat transfer pipes. For example, the cooling medium CM is seawater or river water. The steam exhausted from the steam turbine 11 is converted into water after being cooled by the cooling medium CM flowing inside the heat transfer pipe. Hereinafter, the water may be referred to as condensate in some cases. A portion below the heat transfer pipe group 13*t* inside the condenser casing 13*c* forms a hot well 13*ch*. The condensate is accumulated in the hot well 13*ch*.

The pure water supply apparatus 15 has a pure water tank 16 capable of storing pure water, a pure water line 17 capable of guiding the pure water inside the pure water tank 16 into the condenser casing 13*c*, a pure water pump 18 provided in the pure water line 17, and a pure water control valve 19 disposed closer to the condenser 13 than the pure water pump 18 in the pure water line 17 is. The pure water control valve 19 is opened when the amount of condensate inside the condenser casing 13*c* decreases, and the pure water inside the pure water tank 16 is replenished into the condenser casing 13*c* as the condensate.

The main steam line 23 connects a steam outlet of the boiler 10 and a steam inlet of the turbine casing 11*c*. The main steam line 23 is provided with a steam stop valve 24 for stopping an inflow of the steam into the steam turbine 11, and a steam control valve 25 for adjusting a flow rate of the steam flowing into the steam turbine 11.

The bypass line 26 is branched from a position closer to the boiler 10 than the steam stop valve 24 in the main steam line 23 is. The bypass line 26 is connected to the condenser casing 13*c*. The bypass line 26 is provided with a bypass valve 28 and an inertial filter 29.

Figure 2:
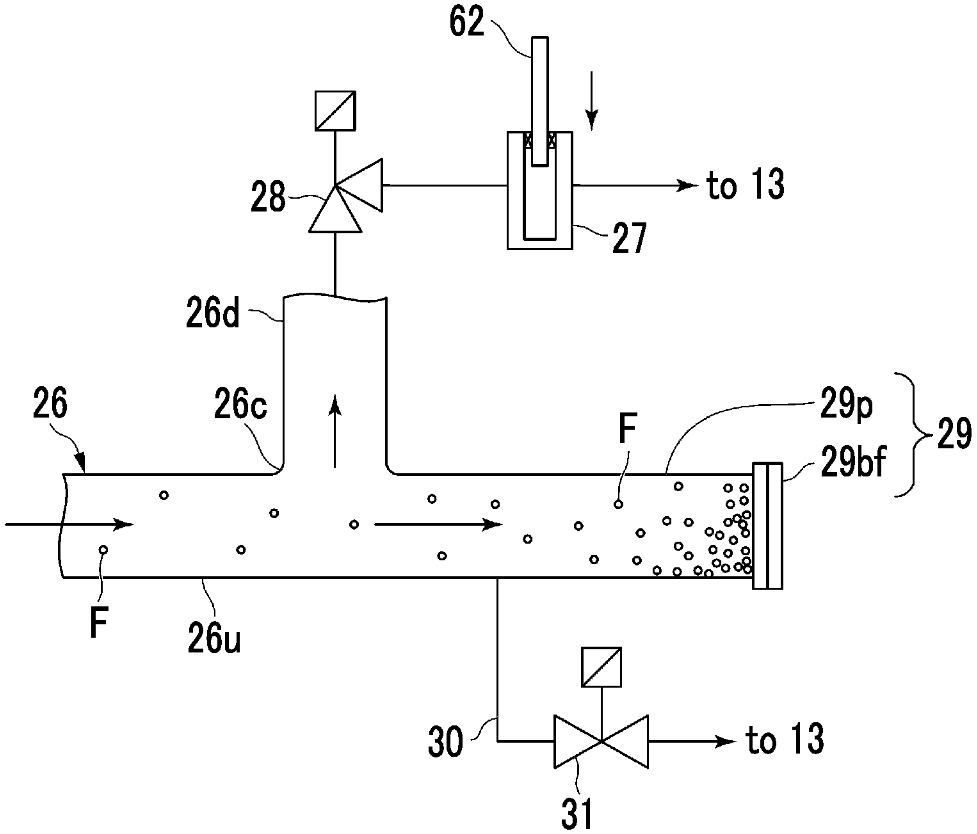
FIG. 2 is a view illustrating a configuration of an inertial filter according to the embodiment of the present disclosure.

As illustrated in FIG. 2, the bypass line 26 has an upstream straight pipe portion 26*u*, a bent portion 26*c*, and a downstream straight pipe portion 26*d*. A portion from the bent portion 26*c* to the boiler 10 side at a prescribed distance in the bypass line 26 forms the upstream straight pipe portion 26*u*. In addition, a portion from the bent portion 26*c* to the condenser 13 side at a prescribed distance in the bypass line 26 forms the downstream straight pipe portion 26*d*. The downstream straight pipe portion 26*d* forms a predetermined angle (for example, 90°) with respect to the upstream straight pipe portion 26*u*. The inertial filter 29 has a straight pipe 29*p* connected to a side opposite to the upstream straight pipe portion 26*u* with reference to the bent portion 26*c*, and a blind flange 29*bf* for closing an end of the straight pipe 29*p*. An extending direction of the straight pipe 29*p* of the inertial filter 29 is the same as an extending direction of the upstream straight pipe portion 26*u* of the bypass line 26. Therefore, the straight pipe 29*p* of the inertial filter 29 and the upstream straight pipe portion 26*u* of the bypass line 26 are located on the same straight line. The bypass valve 28 is connected to a tip of the downstream straight pipe portion 26*d* of the bypass line 26. Due to the inertia, a foreign substance F having a large mass in the steam flowing through the bypass line 26 moves straight from the upstream straight pipe portion 26*u*, passes through the bent portion 26*c*, and flows into the inertial filter 29. As a result, the foreign substance F having a large mass in the steam is captured by the inertial filter 29. Therefore, the foreign substances F are reduced in the steam passing through the bent portion 26*c* and flowing into the downstream straight pipe portion 26*d*, and the foreign substances F included in the steam passing through the bypass valve 28 and in the steam flowing into the condenser 13 can be reduced.

A bypass steam blow line 30 is connected to the straight pipe 29*p* of the inertial filter 29. The bypass steam blow line 30 is also connected to the condenser casing 13*c*, as in the bypass line 26. A bypass steam blow valve 31 is provided in the bypass steam blow line 30.

A target insertion portion 27 is provided at a position closer to the condenser 13 than the bypass valve 28 in the bypass line 26 is. The target insertion portion 27 is a portion that enables insertion of a target 62 for closing a portion of the bypass line 26 into the bypass line 26. For example, the target 62 is an iron plate.

As illustrated in FIG. 1, both a connection position between the bypass line 26 and the condenser casing 13*c* and a connection position between the bypass steam blow line 30 and the condenser casing 13*c* are positions closer to the steam turbine 11 than a position where the heat transfer pipe group 13*t* is disposed in the condenser casing 13*c* is.

The condensate line 32 connects the hot well 13*ch* of the condenser casing 13*c* and a suction port of the condensate pump 21. A condensate outlet valve 33 is provided in the condensate line 32.

The water supply line 34 connects a discharge port of the condensate pump 21 and a water inlet of the boiler 10. The water supply line 34 is provided with the water supply pump 22 that feeds the water to the boiler 10 by raising a pressure of the water from the condensate pump 21. The water supply control valve 35 that adjusts a flow rate of the water fed to the boiler 10 is provided at a position closer to the boiler 10 than the water supply pump 22 in the water supply line 34 is. In addition, the water quality detector 36 is connected at a position closer to the condensate pump 21 than the water supply pump 22 in the water supply line 34 is. The water quality detector 36 detects a contamination degree of the water flowing through the water supply line 34. The water supply blow line 37 is connected to a position closer to the condensate pump 21 than the connection position of the water quality detector 36 in the water supply line 34 is. The wastewater treatment apparatus 20 is connected to a tip of the water supply blow line 37. The wastewater treatment apparatus 20 performs purification treatment on the water flowing through the water supply line 34. The water supply blow line 37 is connected to the wastewater treatment apparatus 20 to communicate with a treatment water receiving space that receives the water serving as a purification treatment target in the wastewater treatment apparatus 20. The water supply blow valve 38 is provided in the water supply blow line 37. The water supply blow valve 38 is opened when the contamination degree detected by the water quality detector 36 is equal to or higher than a predetermined contamination degree.

The permanent section A of the steam turbine plant further includes a first connection unit 41, a second connection unit 42, a third connection unit 43, and a fourth connection unit 44. The first connection unit 41 has a first connection seat 41*s* that can be connected to a first line, and a first branch pipe 41*p* branched from a position closer to the condenser 13 than the condensate outlet valve 33 in the condensate line 32 is. The first connection seat 41*s* is a connection flange, and is provided in an end of the first branch pipe 41*p*. The second connection unit 42 has a second connection seat 42*s* that can be connected to a second line, and a second branch pipe 42*p* branched from a position closer to the condensate pump 21 than the condensate outlet valve 33 in the condensate line 32 is. The second connection seat 42*s* is a connection flange, and is provided in an end of the second branch pipe 42*p*. The third connection unit 43 has a third connection seat 43*s* that can be connected to the second line, and a third branch pipe 43*p* branched from a position closer to the condenser 13 than the pure water pump 18 is and closer to the pure water tank 16 than the pure water control valve 19 in the pure water line 17 is. The third connection seat 43*s* is a connection flange, and is provided in an end of the third branch pipe 43*p*. The fourth connection unit 44 has a fourth connection seat 44*s* that can be connected to a third line, and a communication pipe 44*p* that communicates with the treatment water receiving space of the wastewater treatment apparatus 20. The fourth connection seat 44*s* is a connection flange, and is provided in an end of the communication pipe 44*p*. Blind flanges 41*bf*, 42*bf*, 43*bf*, and 44*bf* are respectively connected to the connection seats 41*s*, 42*s*, 43*s*, and 44*s*.

In the steam turbine plant, the steam turbine 11 can be activated, and the steam turbine 11 can be operated only in the permanent section A described above.

When the steam turbine 11 is activated, the condensate outlet valve 33, the water supply control valve 35, and the bypass valve 28 are opened, and the bypass steam blow valve 31 and the water supply blow valve 38 are closed. When the steam turbine 11 is activated, the condensate pump 21 and the water supply pump 22 are driven in the above-described state, and the water inside the condenser 13 is supplied to the boiler 10. In the boiler 10, the water is heated into steam. The steam generated in the boiler 10 flows into the condenser 13 via the main steam line 23, the bypass line 26, and the bypass valve 28. The steam is cooled inside the condenser 13, and is converted to water.

When the steam from the boiler 10 meets a steam condition, the bypass valve 28 is closed. In contrast, the steam stop valve 24 and the steam control valve 25 are opened, and the steam from the boiler 10 is supplied to the steam turbine 11. The steam condition is a condition of the steam that can be supplied to the steam turbine 11. Specifically, for example, the steam condition is set so that the temperature of the steam is equal to or higher than a predetermined temperature and the amount of the generated steam is equal to or larger than a predetermined amount.

When the steam is supplied to the steam turbine 11, the turbine rotor 11*r* is rotated by the steam. The steam rotating the turbine rotor 11*r* is exhausted from the steam turbine 11, and flows into the condenser 13. The steam flowing into the condenser 13 is cooled by the cooling medium CM flowing through the plurality of heat transfer pipes inside the condenser casing 13*c*, and is converted to water. The water is supplied to the boiler 10 via the condensate line 32 and the water supply line 34.

For example, an opening degree of the steam control valve 25 is controlled, based on a request output signal from the outside.

When the contamination degree detected by the water quality detector 36 is equal to or higher than a predetermined contamination degree, the water supply blow valve 38 is opened. As a result, a portion of the water flowing through the water supply line 34 flows into the wastewater treatment apparatus 20. The wastewater treatment apparatus 20 purifies the water, and thereafter, discharges the water to the outside.

When the amount of the condensate accumulated in the hot well 13*ch* of the condenser casing 13*c* is reduced, the pure water control valve 19 is opened, and the pure water pump 18 is driven. As a result, the water inside the pure water tank 16 is replenished into the condenser casing 13*c* as the condensate.

Figure 3:
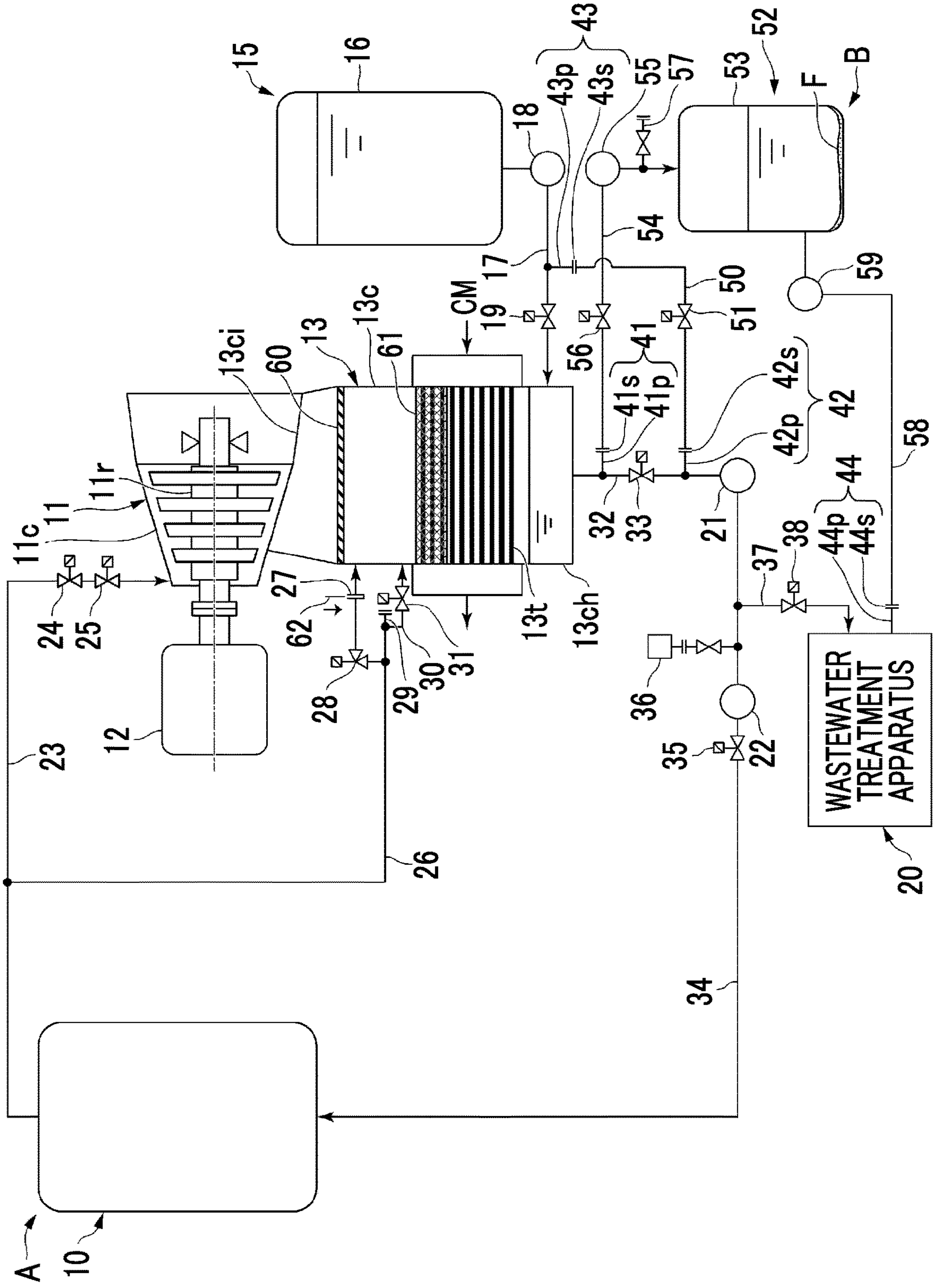
FIG. 3 is a system diagram of the permanent section and a temporary section of the steam turbine plant according to the embodiment of the present disclosure.

As illustrated in FIG. 3, a temporary section B of the steam turbine plant has a temporary pure water line 50, a temporary pure water control valve 51, a blowing water recovery apparatus 52, a turbine protection plate 60, a heat transfer pipe protection net 61, and the target 62.

The temporary pure water line 50 can be connected to the second connection seat 42*s* and to the third connection seat 43*s* as the above-described second line. The temporary pure water line 50 has a connection flange that can be connected to the second connection seat 42*s* serving as the connection flange, and a connection flange that can be connected to the third connection seat 43*s* serving as the connection flange. The temporary pure water control valve 51 is provided in the temporary pure water line 50.

The blowing water recovery apparatus 52 has a blowing water tank 53, a blowing water line 54, a blowing water pump 55, a blowing water valve 56, a sampling nozzle 57, a blowing water discharge line 58, and a blowing water discharge pump 59. The blowing water tank 53 is a tank that can temporarily store the water from the condenser 13. The blowing water line 54 is a line connecting the first connection seat 41*s* and the blowing water tank 53 and guiding the water from the condenser 13 to the blowing water tank 53. The blowing water line 54 has a connection flange that can be connected to the first connection seat 41*s* serving as the connection flange. The blowing water line 54 is the first line described above. The blowing water line 54 is provided with the blowing water valve 56, the blowing water pump 55, and the sampling nozzle 57. The blowing water pump 55 is provided closer to the blowing water tank 53 than the blowing water valve 56 is. The sampling nozzle 57 is provided closer to the blowing water tank 53 than the blowing water pump 55 is. The blowing water discharge line 58 is a line connecting the blowing water tank 53 and the fourth connection seat 44*s* and guiding the water inside the blowing water tank 53 to the wastewater treatment apparatus 20. The blowing water discharge line 58 has a connection flange that can be connected to the fourth connection seat 44*s* serving as the connection flange. The blowing water discharge pump 59 is provided in the blowing water discharge line 58.

The turbine protection plate 60 is a partition plate provided closer to the steam turbine 11 than the connection position between the condenser casing 13*c* and the bypass line 26 is and the connection position between the condenser casing 13*c* and the bypass steam blow line 30 inside the condenser casing 13*c* is, and partitioning a space inside the condenser casing 13*c* into the heat transfer pipe group 13*t* side and the steam turbine 11 side.

The heat transfer pipe protection net 61 is a net that can cover at least a side into which the steam from the bypass line 26 flows in the heat transfer pipe group 13*t*. In other words, the heat transfer pipe protection net 61 is a net that can cover at least the steam turbine 11 side in the heat transfer pipe group 13*t*. For example, the heat transfer pipe protection net 61 is a wire net. For example, the heat transfer pipe protection net 61 is a net having 40 meshes per inch (25.4 mm).

[Method for Cleaning Steam Turbine Plant]

Figure 4:
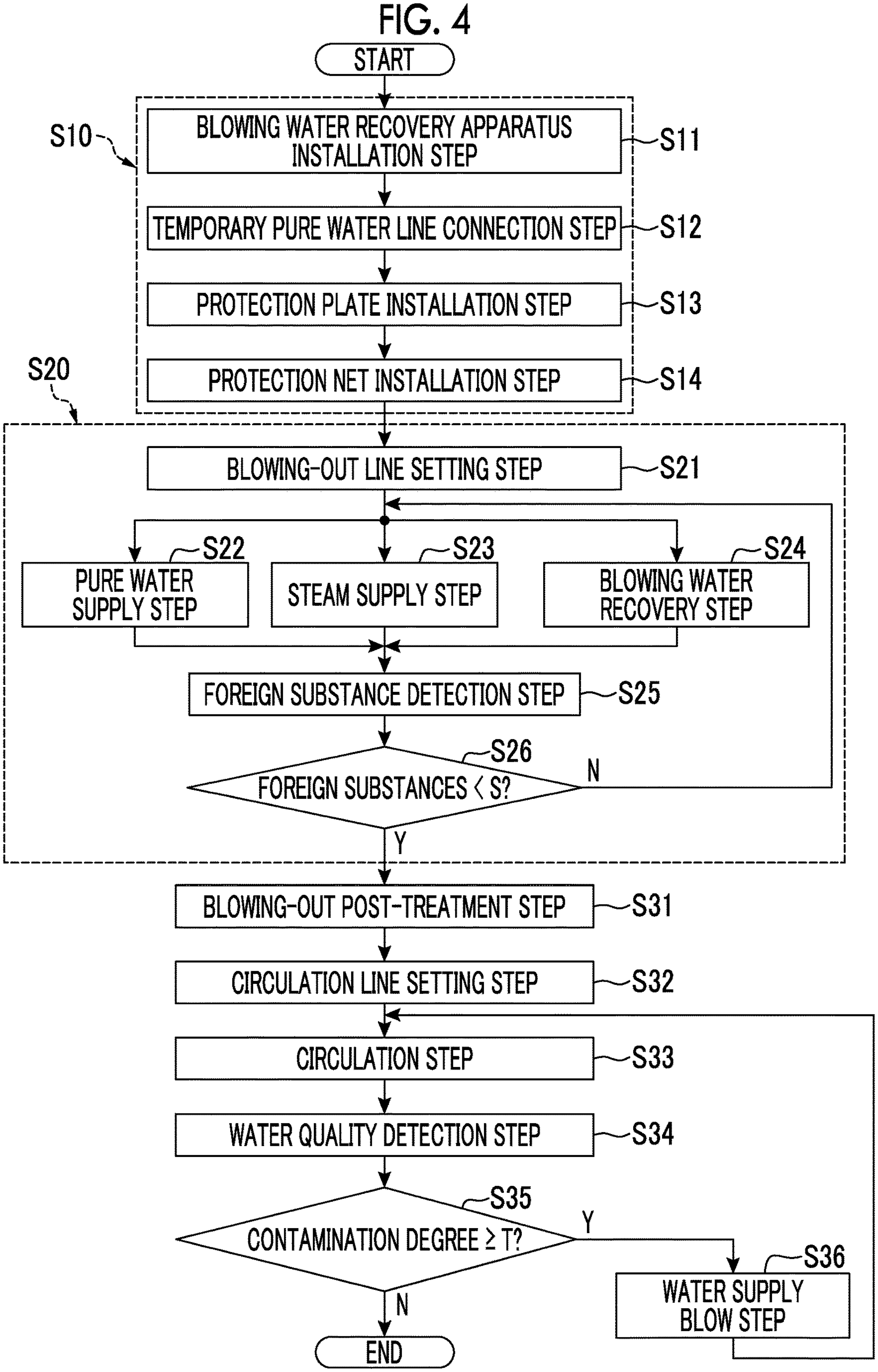
FIG. 4 is a flowchart illustrating a procedure of a cleaning method according to an embodiment of the present disclosure.

A method for cleaning the steam turbine plant according to the present embodiment will be described with reference to a flowchart illustrated in FIG. 4.

After the permanent section A of the steam turbine plant is constructed or after the permanent section A is repaired, foreign substances such as welding slag and grinding debris remain inside pipes or inside various devices. In the present embodiment, in order to remove the foreign substances, a cleaning method described below is performed.

In the cleaning method of the present embodiment, first, a preparation step (S10) is performed. The preparation step (S10) includes a blowing water recovery apparatus installation step (S11), a temporary pure water line connection step (S12), a protection plate installation step (S13), and a protection net installation step (S14).

In the blowing water recovery apparatus installation step (S11), the blowing water recovery apparatus 52 which is a portion of the temporary section B is connected to the permanent section A. In this case, the blowing water line 54 of the blowing water recovery apparatus 52 is connected to the first connection seat 41*s* connected to the condensate line 32 by means of flange connection. In addition, the blowing water discharge line 58 of the blowing water recovery apparatus 52 is connected to the fourth connection seat 44*s* connected to the wastewater treatment apparatus 20 by means of flange connection.

In the temporary pure water line connection step (S12), the temporary pure water line 50 provided with the temporary pure water control valve 51 is connected to the permanent section A. In this case, the temporary pure water line 50 is connected to the second connection seat 42*s* connected to the condensate line 32 by means of flange connection, and the temporary pure water line 50 is connected to the third connection seat 43*s* connected to the pure water line 17 of the pure water supply apparatus 15 by means of flange connection.

In the protection plate installation step (S13), the turbine protection plate 60 is provided closer to the steam turbine 11 than the connection position between the condenser casing 13*c* and the bypass line 26 is and the connection position between the condenser casing 13*c* and the bypass steam blow line 30 inside the condenser casing 13*c* is. As a result, the space inside the condenser casing 13*c* is partitioned by the turbine protection plate 60 into the heat transfer pipe group 13*t* side and the steam turbine 11 side. In the protection net installation step (S14), in the heat transfer pipe group 13*t* of the condenser 13, a side into which the steam from the bypass line 26 flows is covered by the heat transfer pipe protection net 61.

According to the above-described flow, the preparation step (S10) is completed. As described above, the preparation step (S10) is a step of providing the temporary section B in the permanent section A. In the preparation step (S10), when a portion of the line of the temporary section B is connected to the permanent section A, the line can be connected to the permanent section A by means of flange connection. Therefore, the line can be easily connected to the permanent section A. The blowing water recovery apparatus installation step (S11), the temporary pure water line connection step (S12), the protection plate installation step (S13), and the protection net installation step (S14) may be performed in any desired order in the preparation step (S10).

When the preparation step (S10) is completed, a blowing-out step (S20) is performed. The blowing-out step (S20) includes a blowing-out line setting step (S21), a pure water supply step (S22), a steam supply step (S23), a blowing water recovery step (S24), a foreign substance detection step (S25), and a foreign substance amount determination step (S26).

In the blowing-out line setting step (S21), the steam stop valve 24, the condensate outlet valve 33, the pure water control valve 19, and the water supply blow valve 38 are closed. In addition, in the blowing-out step (S20), the water supply control valve 35, the bypass valve 28, and the bypass steam blow valve 31 are opened.

In the pure water supply step (S22), the pure water pump 18, the condensate pump 21, and the water supply pump 22 are driven. As a result, the water inside the pure water tank 16 is supplied to the boiler 10 via the temporary pure water line 50, the condensate pump 21, the water supply line 34, the water supply pump 22, and the water supply control valve 35.

In the steam supply step (S23), the water supplied to the boiler 10 in the pure water supply step (S22) is heated in the boiler 10 to convert the water into steam. The steam flows into the condenser casing 13*c* via the main steam line 23, the bypass line 26, and the bypass steam blow line 30. The steam flowing into the condenser casing 13*c* is cooled by heat exchange with the cooling medium CM flowing in the plurality of heat transfer pipes inside the condenser casing 13*c* to become water. The water is accumulated in the hot well 13*ch* of the condenser casing 13*c*.

In the blowing water recovery step (S24), the blowing water valve 56 is opened, and the blowing water pump 55 is driven. As a result, the water accumulated in the hot well 13*ch* of the condenser 13 is fed to the blowing water tank 53 via the blowing water line 54 and the blowing water pump 55.

The pure water supply step (S22), the steam supply step (S23), and the blowing water recovery step (S24) which are described above are performed. In this manner, the foreign substances inside the water supply line 34, the boiler 10, a portion of the main steam line 23, the bypass line 26, and the condenser 13 can be recovered in the blowing water tank 53. In this way, in the present embodiment, the steam containing the foreign substances is converted to water, and thereafter, the steam is recovered in the blowing water tank 53. Therefore, contamination and noise around the plant can be reduced.

In the present embodiment, the inertial filter 29 is connected at a position closer to the boiler 10 than the bypass valve 28 in the bypass line 26 is. Therefore, a portion of the foreign substances flowing through the bypass line 26 together with the steam can be recovered in the inertial filter 29 before reaching the bypass valve 28. The foreign substances which can be recovered in the inertial filter 29 have a relatively strong inertial force, in other words, have a relatively large mass. Therefore, in the present embodiment, closing of the bypass valve 28 can be avoided in the steam supply step (S23).

In the present embodiment, the turbine protection plate 60 is provided inside the condenser casing 13*c*. Therefore, it is possible to prevent the steam containing the foreign substances from flowing into the turbine casing 11*c*. In addition, in the present embodiment, the side into which the steam from the bypass line 26 and the bypass steam blow line 30 flows in the heat transfer pipe group 13*t* is covered by the heat transfer pipe protection net 61. Therefore, it is possible to prevent the foreign substances from adhering to a plurality of heat transfer pipes forming the heat transfer pipe group 13*t*.

The foreign substances F precipitate inside the blowing water tank 53. When the amount of the water inside the blowing water tank 53 increases, the blowing water discharge pump 59 is driven. As a result, a portion of the water inside the blowing water tank 53 flows into the wastewater treatment apparatus 20, and purification treatment is performed here. In the present embodiment, the water from the condenser 13 is fed to the wastewater treatment apparatus 20 via the blowing water tank 53. Therefore, a total amount of the foreign substances contained in the water from the condenser 13 is not fed to the wastewater treatment apparatus 20. Therefore, a treatment load of the wastewater treatment apparatus 20 can be reduced.

The foreign substance detection step (S25) and the foreign substance amount determination step (S26) are performed while the pure water supply step (S22), the steam supply step (S23), and the blowing water recovery step (S24) are performed. In the foreign substance detection step (S25), a foreign substance amount contained in the water or the steam flowing through various lines is detected during the pure water supply step (S22), the steam supply step (S23), and the blowing water recovery step (S24). Specifically, the target 62 is inserted into the target insertion portion 27 provided in the bypass line 26 for a predetermined time, and thereafter, the foreign substance amount is detected within the predetermined time from a foreign substance collision trace remaining in the target 62. Alternatively, the water flowing through the blowing water line 54 is recovered from the sampling nozzle 57 connected to the blowing water line 54, and the foreign substance amount contained in the water is detected. In the foreign substance amount determination step (S26), it is determined whether or not the foreign substance amount detected in the foreign substance detection step (S25) is smaller than a predetermined amount S. The predetermined amount S with respect to the foreign substance amount detected by using the target 62 and the predetermined amount S with respect to the foreign substance amount in the sampled water are different from each other. When it is determined in the foreign substance amount determination step (S26) that the foreign substance amount is smaller than the predetermined amount S, the pure water pump 18, the condensate pump 21, and the water supply pump 22 are stopped, and the blowing-out step (S20) is completed. On the other hand, when it is determined in the foreign substance amount determination step (S26) that the foreign substance amount is not smaller than the predetermined amount S, in other words, the foreign substance amount is equal to or larger than the predetermined amount S, the pure water supply step (S22), the steam supply step (S23), and the blowing water recovery step (S24) are continued until the foreign substance amount is smaller than the predetermined amount S.

Only one of detecting the foreign substance amount by using the target 62 and detecting the foreign substance amount in the sampled water may be performed, or both of these may be performed. In a case where both of these are performed, when the foreign substance amount detected by using the target 62 is smaller than the predetermined amount S and the foreign substance amount in the sampled water is smaller than the predetermined amount S, the blowing-out step (S20) is completed.

When the blowing-out step (S20) is completed, a blowing-out post-treatment step (S31) is performed. The blowing-out post-treatment step (S31) is a step of removing the temporary section B from the permanent section A. Specifically, in the blowing-out post-treatment step (S31), the turbine protection plate 60 and the heat transfer pipe protection net 61 inside the condenser casing 13*c* are recovered from the inside of the condenser casing 13*c*. Furthermore, the blowing water recovery apparatus 52 and the temporary pure water line 50 are removed from the permanent section A. In this case, the blind flange 41*bf* is connected to the first connection seat 41*s* to which the blowing water line 54 of the blowing water recovery apparatus 52 is connected, and the blind flange 44*bf* is connected to the fourth connection seat 44*s* to which the blowing water discharge line 58 of the blowing water recovery apparatus 52 is connected. Furthermore, the blind flanges 42*bf* and 43*bf* are respectively connected to the second connection seat 42*s* and the third connection seat 43*s* to which the temporary pure water line 50 is connected.

In the blowing-out post-treatment step (S31) described above, the blowing water recovery apparatus 52 and the temporary pure water line 50 which are portions of the temporary section B are removed from the permanent section A. However, in the blowing-out post-treatment step (S31), both of these may not be removed from the permanent section A. That is, the blowing water recovery apparatus 52 and the temporary pure water line 50 may be permanently installed. In this case, the blowing water valve 56 and the temporary pure water control valve 51 are brought into a closed state while the blowing-out step (S20) is not performed.

When the blowing-out post-treatment step (S31) is completed, a circulation line setting step (S32) is performed. In the circulation line setting step (S32), the steam stop valve 24 is continuously closed, and the bypass valve 28 is continuously opened. Furthermore, the condensate outlet valve 33 and the water supply control valve 35 are opened.

When the circulation line setting step (S32) is completed, a circulation step (S33) is performed. In the circulation step (S33), the condensate pump 21 and the water supply pump 22 are driven. As a result, the water inside the condenser 13 is supplied to the boiler 10 via the condensate line 32, the condensate pump 21, the water supply line 34, and the water supply pump 22. Inside the boiler 10, the water is heated into steam. The steam flows into the condenser casing 13*c* via the main steam line 23 and the bypass line 26. The steam flowing into the condenser casing 13*c* is cooled into the water by heat exchange with the cooling medium CM flowing in the plurality of heat transfer pipes inside the condenser casing 13*c*. The water is accumulated in the hot well 13*ch* of the condenser casing 13*c*. As described above, the water accumulated in the hot well 13*ch* is supplied to the boiler 10 via the condensate pump 21 and the water supply pump 22. That is, in the circulation step (S33), the water (including the water serving as a liquid and the steam serving as a gas) circulates in a circulation line configured to include the condenser 13, the condensate line 32, the condensate pump 21, the water supply line 34, the water supply pump 22, the boiler 10, a portion of the main steam line 23, the bypass line 26, and the bypass valve 28.

A water quality detection step (S34) is performed during the circulation step (S33). In the water quality detection step (S34), the water quality detector 36 connected to the water supply line 34 detects water quality of the water flowing through the water supply line 34. When the water quality detected in the water quality detection step (S34) is equal to or higher than a predetermined contamination degree T, a water supply blow step (S36) is performed. In the water supply blow step (S36), the water supply blow valve 38 provided in the water supply blow line 37 is opened.

As a result, a portion of the water flowing through the water supply line 34 flows into the wastewater treatment apparatus 20 via the water supply blow line 37. The wastewater treatment apparatus 20 performs purification treatment on the water. Therefore, the foreign substances contained in the water flowing through the water supply line 34 are reduced. The circulation step (S33) is also performed during the water supply blow step (S36). While the water supply blow step (S36) is performed, when the amount of the condensate accumulated in the hot well 13*ch* of the condenser casing 13*c* is reduced, the pure water control valve 19 is opened, and the pure water pump 18 is driven. As a result, the water inside the pure water tank 16 is replenished into the condenser casing 13*c* as the condensate.

When the water quality detected in the water quality detection step (S34) is lower than the predetermined contamination degree T during the circulation step (S33), the circulation step (S33) and the water supply blow step (S36) are completed.

According to the above-described flow, the cleaning method of the present embodiment is completed.

After the cleaning method described above is completed, the condensate pump 21 and the water supply pump 22 may be continuously driven, and the steam from the boiler 10 may be allowed to flow into the steam turbine 11 via the main steam line 23. In this manner, the process may proceed to a normal operation. In addition, after the cleaning method is completed, the driving of the condensate pump 21 and the water supply pump 22 may be stopped, and thereafter, as described above, the condensate pump 21 and the water supply pump 22 may be driven again to activate the steam turbine 11.

In the present embodiment, the circulation step (S33) is performed after the blowing-out step (S20), and the foreign substances are also removed in the circulation step (S33). Therefore, only the blowing-out is performed. Compared to when the circulation step (S33) is not performed, the amount of the pure water used while the cleaning method of the present embodiment is used can be reduced. Furthermore, in the present aspect, before the operation of the steam turbine plant starts, the contamination degree of the steam planned to be supplied to the steam turbine 11 can be reduced to such a contamination degree that the steam can be supplied to the steam turbine 11. The contamination degree that the steam can be supplied to the steam turbine 11 is a predetermined contamination degree so that damage to the steam turbine 11 can be reduced even when the steam is supplied to the steam turbine 11.

[Modification Example]

In the above-described embodiment, the protection plate installation step (S13) and the protection net installation step (S14) are performed. However, the protection plate installation step (S13) and the protection net installation step (S14) may be omitted.

Although the condenser 13 of the above-described embodiment is a water cooling type condenser, the condenser 13 may be an air cooling type condenser. In a case of the air cooling type condenser, the steam flows through a plurality of heat transfer pipes inside the condenser casing, and air from a fan is fed to the plurality of heat transfer pipes. In this manner, heat is exchanged between the air and the steam to cool the steam.

Therefore, even when the turbine protection plate 60 is installed inside the condenser casing, it is not possible to prevent the steam from the bypass line 26 from flowing into the steam turbine 11. In addition, even when the heat transfer pipe group is covered by the heat transfer pipe protection net 61, it is not possible to prevent the foreign substances from adhering to an outer periphery of the heat transfer pipe. Therefore, when the condenser 13 is the air cooling type condenser, the protection plate installation step (S13) and the protection net installation step (S14) are not performed.

As described above, in a case where the protection plate installation step (S13) and the protection net installation step (S14) are not performed, when the blowing-out step (S20) is completed, the circulation line setting step (S32) may be performed without stopping the condensate pump 21 and the water supply pump 22.

In the above-described embodiment, the water accumulated in the blowing water tank 53 is fed to the wastewater treatment apparatus 20. However, only clean water having a small amount of the foreign substances in the water accumulated in the blowing water tank 53 may be drained to a river.

[Additional Notes]

The steam turbine plant in the above-described embodiment can be understood as follows, for example.

(1) According to a first aspect, the steam turbine plant includes the boiler 10 capable of generating the steam, the steam turbine 11 that can be driven by the steam from the boiler 10, the condenser 13 capable of converting the steam exhausted from the steam turbine 11 to water, the condensate pump 21 capable of raising the pressure of the water from the condenser 13, the main steam line 23 capable of guiding the steam generated in the boiler 10 to the steam turbine 11, the steam stop valve 24 provided in the main steam line 23 and capable of stopping the inflow of the steam into the steam turbine 11, the bypass line 26 branched from the position closer to the boiler 10 than the steam stop valve 24 in the main steam line 23 is and connected to the condenser 13, the bypass valve 28 provided in the bypass line 26, the condensate line 32 capable of guiding the water inside the condenser 13 to the condensate pump 21, the condensate outlet valve 33 provided in the condensate line 32, the water supply line 34 capable of guiding the water whose pressure is raised by the condensate pump 21 to the boiler 10, and the pure water supply apparatus 15. The pure water supply apparatus 15 includes the pure water tank 16 capable of storing the pure water, the pure water line 17 capable of guiding the pure water inside the pure water tank 16 to the condenser 13, the pure water pump 18 provided in the pure water line 17, and the pure water control valve 19 provided closer to the condenser 13 than the pure water pump 18 in the pure water line 17 is. The steam turbine plant further includes the first connection unit 41 branched from the position closer to the condenser 13 than the condensate outlet valve 33 in the condensate line 32 is, the second connection unit 42 branched from the position closer to the condensate pump 21 than the condensate outlet valve 33 in the condensate line 32 is, and the third connection unit 43 branched from the position closer to the condenser 13 than the pure water pump 18 is and closer to the pure water tank 16 than the pure water control valve 19 in the pure water line 17 is. The first connection unit 41 has the first connection seat 41*s* that can be connected to the first line. The second connection unit 42 has the second connection seat 42*s* that can be connected to the second line. The third connection unit 43 has the third connection seat 43*s* that can be connected to the second line.

In the steam turbine plant of the present aspect, when the blowing-out is performed, the condensate pump 21 is driven in a state where the steam stop valve 24, the bypass valve 28, and the condensate outlet valve 33 are closed, and the pure water is supplied to the condensate pump 21 from the second connection unit 42. As a result, the pure water flows into the boiler 10 via the water supply line 34. The steam flowing into the boiler 10 flows into the condenser 13 via a portion of the main steam line 23 and the bypass line 26. The steam is converted to water inside the condenser 13, and is accumulated inside the condenser 13. The water accumulated inside the condenser 13 is discharged from the condensate line 32 and the first connection unit 41, and is recovered in the container such as the tank. In this way, in the steam turbine plant of the present aspect, the steam containing foreign substances can be returned to the water, and thereafter, can be recovered in the container. Therefore, contamination and noise around the plant can be reduced.

In addition, in the steam turbine plant of the present aspect, the pure water inside the pure water tank 16 can be supplied to the condensate pump 21 by connecting the second connection seat 42*s* and the third connection seat 43*s* to the second line. Moreover, in the steam turbine plant of the present embodiment, the first connection unit 41, the second connection unit 42, and the third connection unit 43 respectively have the connection seats 41*s*, 42*s*, and 43*s*. Therefore, the connection units 41, 42, and 43 can be easily connected to the lines.

(2) According to the steam turbine plant in a second aspect, in the steam turbine plant of the first aspect, the first connection seat 41*s*, the second connection seat 42*s*, and the third connection seat 43*s* are all connection flanges.

In the steam turbine plant of the present aspect, the line can be connected to each of the first connection seat 41*s*, the second connection seat 42*s*, and the third connection seat 43*s* by means of flange connection.

(3) According to the steam turbine plant in a third aspect, the steam turbine plant of the first aspect or the second aspect further includes the inertial filter 29 installed closer to the boiler 10 than the bypass valve 28 in the bypass line 26 is and capable of removing the foreign substances contained in the steam flowing through the bypass line 26.

In the steam turbine plant of the present aspect, the foreign substance amount flowing into the bypass valve 28 can be reduced while the blowing-out is performed.

(4) According to the steam turbine plant in a fourth aspect, the steam turbine plant according to any one of the first aspect to the third aspect further includes the wastewater treatment apparatus 20 capable of purifying the water from the water supply line 34, the water supply blow line 37 branched from the water supply line 34 and capable of guiding the water flowing through the water supply line 34 to the wastewater treatment apparatus 20, the water supply blow valve 38 provided in the water supply blow line 37, and the water quality detector 36 connected to the water supply line 34 and capable of detecting the water quality of the water flowing through the water supply line 34.

In the steam turbine plant of the present aspect, when the contamination degree of the water flowing through the water supply line 34 is high, a portion of the water flowing through the water supply line 34 can be fed to the wastewater treatment apparatus 20 via the water supply blow line 37. Therefore, in the present aspect, the contamination degree of the water flowing through the water supply line 34 can be reduced.

(5) According to the steam turbine plant in a fifth aspect, the steam turbine plant according to any one of the first aspect to the fourth aspect further includes the blowing water recovery apparatus 52. The blowing water recovery apparatus 52 includes the blowing water tank 53 capable of temporarily storing the water from the condenser 13, the blowing water line 54 connecting the first connection seat 41*s* and the blowing water tank 53 and capable of guiding the water from the condenser 13 to the blowing water tank 53, and the blowing water valve 56 provided in the blowing water line 54. The first line is the blowing water line 54.

In the steam turbine plant of the present aspect, while the blowing-out is performed, the water accumulated inside the condenser 13 can be recovered in the blowing water tank 53 via the condensate line 32, the first connection unit 41, and the blowing water line 54.

(6) According to the steam turbine plant in a sixth aspect, the steam turbine plant of the fourth aspect further includes the blowing water recovery apparatus 52. The blowing water recovery apparatus 52 includes the blowing water tank 53 capable of temporarily storing the water from the condenser 13, the blowing water line 54 connecting the first connection seat 41*s* and the blowing water tank 53 and capable of guiding the water from the condenser 13 to the blowing water tank 53, the blowing water valve 56 provided in the blowing water line 54, and the blowing water discharge line 58 connecting the blowing water tank 53 and the wastewater treatment apparatus 20 and capable of guiding the water inside the blowing water tank 53 to the wastewater treatment apparatus 20. The first line is the blowing water line 54.

In the steam turbine plant of the present aspect, while the blowing-out is performed, the water accumulated inside the condenser 13 can be recovered in the blowing water tank 53 via the condensate line 32, the first connection unit 41, and the blowing water line 54. Furthermore, in the steam turbine plant of the present aspect, the water accumulated in the blowing water tank 53 can be fed to the wastewater treatment apparatus 20.

(7) According to the steam turbine plant in a seventh aspect, the steam turbine plant according to any one of the first aspect to the sixth aspect further includes the temporary pure water line 50. The temporary pure water line 50 can be connected to the second connection seat 42*s* and to the third connection seat 43*s* as the second line.

In the steam turbine plant of the present aspect, the pure water inside the pure water tank 16 can be supplied to the condensate pump 21 by connecting the second connection seat 42*s* and the third connection seat 43*s* to the temporary pure water line 50 serving as the second line.

(8) According to the steam turbine plant in an eighth aspect, the steam turbine plant according to any one of the first aspect to the seventh aspect further includes the turbine protection plate 60. The condenser 13 includes the condenser casing 13*c* into which the steam from the steam turbine 11 and the steam from the bypass line 26 can flow, and the heat transfer pipe group 13*t* disposed inside the condenser casing 13*c* and configured to include the plurality of heat transfer pipes. The turbine protection plate 60 is provided closer to the steam turbine 11 than the connection position between the condenser casing 13*c* and the bypass line 26 is, inside the condenser casing 13*c*, and can prevent the steam from the bypass line 26 from flowing into the steam turbine 11.

In the steam turbine plant of the present aspect, the turbine protection plate is provided inside the condenser casing before the blowing-out is performed. In this manner, the steam from the bypass line 26 can be prevented from flowing into the steam turbine 11 while the blowing-out is performed.

(9) According to the steam turbine plant in a ninth aspect, the steam turbine plant according to any one of the first aspect to the seventh aspect further includes the heat transfer pipe protection net 61. The condenser 13 includes the condenser casing 13*c* into which the steam from the steam turbine 11 and the steam from the bypass line 26 can flow, and the heat transfer pipe group 13*t* disposed inside the condenser casing 13*c* and configured to include the plurality of heat transfer pipes. The heat transfer pipe protection net 61 can cover at least a side into which the steam from the bypass line 26 flows in the heat transfer pipe group 13*t*.

In the steam turbine plant of the present aspect, the heat transfer pipe group 13*t* is covered by the heat transfer pipe protection net 61 before the blowing-out is performed. In this manner, the foreign substances contained in the steam from the bypass line 26 can be prevented from adhering to the plurality of heat transfer pipes while the blowing-out is performed.

In addition, the method for cleaning the steam turbine plant in the above-described embodiment can be understood as follows, for example.

(10) The method for cleaning the steam turbine plant according to a tenth aspect is applicable to the following steam turbine plant.

The steam turbine plant includes the boiler 10 capable of generating the steam, the steam turbine 11 that can be driven by the steam from the boiler 10, the condenser 13 capable of converting the steam exhausted from the steam turbine 11 to water, the condensate pump 21 capable of raising the pressure of the water from the condenser 13, the main steam line 23 capable of guiding the steam generated in the boiler 10 to the steam turbine 11, the steam stop valve 24 provided in the main steam line 23 and capable of stopping the inflow of the steam into the steam turbine 11, the bypass line 26 branched from the position closer to the boiler 10 than the steam stop valve 24 in the main steam line 23 is and connected to the condenser 13, the bypass valve 28 provided in the bypass line 26, the condensate line 32 capable of guiding the water inside the condenser 13 to the condensate pump 21, the condensate outlet valve 33 provided in the condensate line 32, the water supply line 34 capable of guiding the water whose pressure is raised by the condensate pump 21 to the boiler 10, and the pure water supply apparatus 15 including the pure water tank 16 capable of storing the pure water and capable of supplying the pure water inside the pure water tank 16 into the condenser 13.

In the cleaning method, the preparation step (S10) and the blowing-out step (S20) are performed. The preparation step (S10) includes the blowing water recovery apparatus installation step (S11) of connecting the blowing water recovery apparatus 52 having the blowing water tank 53 capable of temporarily storing the water from the condenser 13 at the position closer to the condenser 13 than the condensate outlet valve 33 in the condensate line 32 is, and the temporary pure water line connection step (S12) of connecting the temporary pure water line 50 to feed the water inside the pure water tank 16, at the position closer to the condensate pump 21 than the condensate outlet valve 33 in the condensate line 32 is. The blowing-out step (S20) includes the blowing-out line setting step (S21) of closing the steam stop valve 24 and the condensate outlet valve 33 and opening the bypass valve 28, the pure water supply step (S22) of supplying the pure water inside the pure water tank 16 to the boiler 10 via the temporary pure water line 50, the condensate pump 21, and the water supply line 34, the steam supply step (S23) of generating the steam by heating the pure water supplied to the boiler 10 inside the boiler 10 in the pure water supply step (S22), guiding the steam generated in the boiler 10 to the condenser 13 via the main steam line 23 and the bypass line 26, and converting the steam guided to the condenser 13 to water inside the condenser 13, and the blowing water recovery step (S24) of feeding the water accumulated inside the condenser 13 in the steam supply step (S23) to the blowing water tank 53.

In the present aspect, in the pure water supply step (S22) in the blowing-out step (S20), the pure water inside the pure water tank 16 is supplied to the boiler 10 via the temporary pure water line 50, the condensate pump 21, and the water supply line 34. In the steam supply step (S23) in the blowing-out step (S20), the pure water is heated inside the boiler 10 to generate the steam, and the steam is guided to the condenser 13 via the main steam line 23 and the bypass line 26. The steam guided to the condenser 13 is converted to water inside the condenser 13. In the blowing water recovery step (S24) in the blowing-out step (S20), the water accumulated inside the condenser 13 is fed to the blowing water tank 53.

In this way, in the present aspect, the steam containing the foreign substances is returned to the water, and thereafter, is recovered in the blowing water tank 53. Therefore, contamination and noise around the plant can be reduced.

(11) According to the method for cleaning the steam turbine plant in an eleventh aspect, in the method for cleaning the steam turbine plant according to the tenth aspect, the preparation step (S10) includes the protection plate installation step (S13) of providing the turbine protection plate 60 preventing the steam from the bypass line 26 from flowing into the steam turbine 11, at the position closer to the steam turbine 11 than the position into which the steam from the bypass line 26 flows is, inside the condenser 13.

In the present aspect, the steam from the bypass line 26 can be prevented from flowing into the steam turbine 11 while the blowing-out step (S20) is performed.

(12) According to the method for cleaning the steam turbine plant in a twelfth aspect, in the method for cleaning the steam turbine plant according to the tenth aspect or the eleventh aspect, the condenser 13 includes the condenser casing 13*c* into which the steam from the steam turbine 11 and the steam from the bypass line 26 can flow, and the heat transfer pipe group 13*t* disposed inside the condenser casing 13*c* and configured to include the plurality of heat transfer pipes capable of condensing the steam by exchanging the heat between the steam flowing into the condenser casing 13*c* and the cooling medium CM. The preparation step (S10) includes the protection net installation step (S14) of covering at least the side into which steam from the bypass line 26 flows with a heat transfer pipe protection net 61 in the heat transfer pipe group 13*t*.

In the present aspect, the steam from the bypass line 26 can be prevented from adhering to the outer periphery of the heat transfer pipe while the blowing-out step (S20) is performed.

(13) According to the method for cleaning the steam turbine plant in a thirteenth aspect, in the method for cleaning the steam turbine plant according to any one of the tenth aspect to the twelfth aspect, the blowing-out step (S20) further includes the foreign substance detection step (S25) of detecting the foreign substance amount contained in the steam flowing from the bypass line 26 into the condenser 13 or the foreign substance amount contained in the water flowing from the condenser 13 into the blowing water tank 53, and the foreign substance amount determination step (S26) of determining whether or not the foreign substance amount is smaller than the predetermined amount. The blowing-out step (S20) is completed on a condition that the foreign substance amount is determined to be smaller than the predetermined amount in the foreign substance amount determination step (S26).

In the present embodiment, the blowing-out step (S20) can be completed at a time at which the foreign substance amount contained in the steam flowing from the bypass line 26 to the condenser 13 or the foreign substance amount contained in the water flowing from the condenser 13 into the blowing water tank 53 is reduced.

(14) According to the method for cleaning the steam turbine plant in a fourteenth aspect, in the method for cleaning the steam turbine plant of the thirteenth aspect, after the blowing-out step (S20), the circulation line setting step (S32), the circulation step (S33), and the water quality detection step (S34) are further performed. In the circulation line setting step (S32), the steam stop valve 24 is closed, and the bypass valve 28 and the condensate outlet valve 33 are opened. In the circulation step (S33), the water inside the condenser 13 is supplied to the boiler 10 via the condensate line 32, the condensate outlet valve 33, the condensate pump 21, and the water supply line 34. The water is heated by the boiler 10 to generate the steam, and the steam generated in the boiler 10 is guided to the condenser 13 via the main steam line 23 and the bypass line 26. The steam guided to the condenser 13 is converted to water inside the condenser 13.

In the water quality detection step (S34), the water quality of the water from the condenser 13 is detected.

In the present aspect, after the blowing-out step (S20), the circulation step (S33) is performed, and the water inside the condenser 13 is supplied to the boiler 10 via the condensate line 32, the condensate outlet valve 33, the condensate pump 21, and the water supply line 34. Then, the water is heated by the boiler 10 to generate the steam, the steam is guided to the condenser 13 via the main steam line 23 and the bypass line 26, and the steam is converted to water inside the condenser 13. In the present aspect, the water quality detection step (S34) is performed during the circulation step (S33) to detect the water quality of the water from the condenser 13. Therefore, in the present aspect, it is possible to check the contamination degree of the steam planned to be supplied to the steam turbine 11 before the steam from the boiler 10 is supplied to the steam turbine 11 to start the operation of the steam turbine plant.

(15) According to the method for cleaning the steam turbine plant in a fifteenth aspect, the method for cleaning the steam turbine plant of the fourteenth aspect further includes the water supply blow step (S36) of blowing the water flowing through the water supply line 34 to the wastewater treatment apparatus 20 capable of purifying the water, when the water quality detected in the water quality detection step (S34) is equal to or higher than the predetermined contamination degree. When the water quality detected in the water quality detection step (S34) is lower than the predetermined contamination degree during the circulation step (S33), the circulation step (S33) and the water supply blow step (S36) are completed.

In the present aspect, when the water quality detected in the water quality detection step (S34) is equal to or higher than the predetermined contamination degree, the water flowing through the water supply line 34 is blown to the wastewater treatment apparatus 20 capable of purifying the water. When the water quality detected in the water quality detection step (S34) is lower than the predetermined contamination degree during the circulation step (S33), the circulation step (S33) and the water supply blow step (S36) are completed. Therefore, in the present aspect, before the operation of the steam turbine plant starts, the contamination degree of the steam planned to be supplied to the steam turbine 11 can be reduced to such a contamination degree that the steam can be supplied to the steam turbine 11. The contamination degree that the steam can be supplied to the steam turbine 11 is a predetermined contamination degree so that damage to the steam turbine 11 can be reduced even when the steam is supplied to the steam turbine 11.

INDUSTRIAL APPLICABILITY

In an aspect of the present disclosure, while the blowing-out is performed, the steam containing the foreign substances can be returned to the water, and thereafter, can be recovered in the container. Therefore, contamination and noise around the plant can be reduced.

REFERENCE SIGNS LIST

A: permanent section
10: boiler
11: steam turbine
11*r*: turbine rotor
11*c*: turbine casing
12: generator
13: condenser
13*c*: condenser casing
13*ci*: steam inlet opening
13*ch*: hot well
13*t*: heat transfer pipe group
15: pure water supply apparatus
16: pure water tank
17: pure water line
18: pure water pump
19: pure water control valve
20: wastewater treatment apparatus
21: condensate pump
22: water supply pump
23: main steam line
24: steam stop valve
25: steam control valve
26: bypass line
26*u*: upstream straight pipe portion
26*c*: bent portion
26*d*: downstream straight pipe portion
27: target insertion portion
28: bypass valve
29: inertial filter
29*p*: straight pipe
29*bf*: blind flange
30: bypass steam blow line
31: bypass steam blow valve
32: condensate line
33: condensate outlet valve
34: water supply line
35: water supply control valve
36: water quality detector
37: water supply blow line
38: water supply blow valve
41: first connection unit
41*p*: first branch pipe
41*s*: first connection seat
41*bf*: blind flange
42: second connection unit
42*p*: second branch pipe
42*s*: second connection seat
42*bf*: blind flange
43: third connection unit
43*p*: third branch pipe
43*s*: third connection seat
43*bf*: blind flange
44: fourth connection unit
44*p*: communication pipe
44*s*: fourth connection seat
44*bf*: blind flange
B: temporary section
50: temporary pure water line
51: temporary pure water control valve
52: blowing water recovery apparatus
53: blowing water tank
54: blowing water line
55: blowing water pump
56: blowing water valve
57: sampling nozzle
58: blowing water discharge line
59: blowing water discharge pump
60: turbine protection plate
61: heat transfer pipe protection net
62: target

The invention claimed is:

1. A steam turbine plant comprising:

a boiler configured to generate steam;

a steam turbine configured to be driven by the steam from the boiler;
a condenser configured to convert the steam exhausted from the steam turbine to water;
a condensate pump configured to raise a pressure of the water from the condenser;
a main steam line configured to guide the steam generated in the boiler to the steam turbine;
a steam stop valve provided in the main steam line and configured to stop an inflow of the steam into the steam turbine;
a bypass line branched from a position closer to the boiler than the steam stop valve in the main steam line is and connected to the condenser;
a bypass valve provided in the bypass line;
a condensate line configured to guide the water inside the condenser to the condensate pump;
a condensate outlet valve provided in the condensate line;
a water supply line configured to guide the water whose pressure is raised by the condensate pump to the boiler;
a pure water supply apparatus including
a pure water tank configured to store pure water,
a pure water line configured to guide the pure water inside the pure water tank to the condenser,
a pure water pump provided in the pure water line, and
a pure water control valve provided closer to the condenser than the pure water pump in the pure water line is;
a first connection unit branched from a position closer to the condenser than the condensate outlet valve in the condensate line is;
a second connection unit branched from a position closer to the condensate pump than the condensate outlet valve in the condensate line is; and
a third connection unit branched from a position closer to the condenser than the pure water pump is and closer to the pure water tank than the pure water control valve in the pure water line is,
wherein the first connection unit has a first connection seat connectable to a first line,
the second connection unit has a second connection seat connectable to a second line, and
the third connection unit has a third connection seat connectable to the second line.

2. The steam turbine plant according to claim 1,
wherein the first connection seat, the second connection seat, and the third connection seat are all connection flanges.

3. The steam turbine plant according to claim 1, further comprising:
an inertial filter installed closer to the boiler than the bypass valve in the bypass line is and configured to remove foreign substances contained in the steam flowing through the bypass line.

4. The steam turbine plant according to claim 1, further comprising:
a wastewater treatment apparatus configured to purify the water from the water supply line;
a water supply blow line branched from the water supply line and configured to guide the water flowing through the water supply line to the wastewater treatment apparatus;
a water supply blow valve provided in the water supply blow line; and
a water quality detector connected to the water supply line and configured to detect water quality of the water flowing through the water supply line.

5. The steam turbine plant according to claim 1, further comprising:
a blowing water recovery apparatus,
wherein the blowing water recovery apparatus includes
a blowing water tank configured to temporarily store the water from the condenser,
a blowing water line connecting the first connection seat and the blowing water tank and configured to guide the water from the condenser to the blowing water tank, and
a blowing water valve provided in the blowing water line, and
the first line is the blowing water line.

6. The steam turbine plant according to claim 4, further comprising:
a blowing water recovery apparatus,
wherein the blowing water recovery apparatus includes
a blowing water tank configured to temporarily store the water from the condenser,
a blowing water line connecting the first connection seat and the blowing water tank and configured to guide the water from the condenser to the blowing water tank,
a blowing water valve provided in the blowing water line, and
a blowing water discharge line connecting the blowing water tank and the wastewater treatment apparatus and configured to guide the water inside the blowing water tank to the wastewater treatment apparatus, and
the first line is the blowing water line.

7. The steam turbine plant according to claim 1, further comprising:
a temporary pure water line,
wherein the temporary pure water line is connectable to the second connection seat and the to third connection seat, as the second line.

8. The steam turbine plant according to claim 1, further comprising:
a turbine protection plate,
wherein the condenser includes
a condenser casing into which the steam from the steam turbine and the steam from the bypass line are configured to flow, and
a heat transfer pipe group disposed inside the condenser casing and configured to include a plurality of heat transfer pipes, and
the turbine protection plate is provided closer to the steam turbine than a connection position between the condenser casing and the bypass line is, inside the condenser casing, and is configured to prevent the steam from the bypass line from flowing into the steam turbine.

9. The steam turbine according to claim 1, further comprising:
a heat transfer pipe protection net,
wherein the condenser includes
a condenser casing into which the steam from the steam turbine and the steam from the bypass line are configured to flow, and
a heat transfer pipe group disposed inside the condenser casing and configured to include a plurality of heat transfer pipes, and
the heat transfer pipe protection net configured to cover at least a side into which the steam from the bypass line flows in the heat transfer pipe group.

10. A method for cleaning a steam turbine plant including a boiler configured to generate steam, a steam turbine configured to be driven by the steam from the boiler, a condenser configured to convert the steam exhausted from the steam turbine to water, a condensate pump configured to raise a pressure of the water from the condenser, a main steam line configured to guide the steam generated in the boiler to the steam turbine, a steam stop valve provided in the main steam line and configured to stop an inflow of the steam into the steam turbine, a bypass line branched from a position closer to the boiler than the steam stop valve in the main steam line is and connected to the condenser, a bypass valve provided in the bypass line, a condensate line configured to guide the water inside the condenser to the condensate pump, a condensate outlet valve provided in the condensate line, a water supply line configured to guide the water whose pressure is raised by the condensate pump to the boiler, and a pure water supply apparatus including a pure water tank configured to store pure water, and configured to supply the pure water inside the pure water tank into the condenser, the method comprising:

a preparation step; and a blowing-out step, wherein the preparation step includes a blowing water recovery apparatus installation step of connecting a blowing water recovery apparatus having a blowing water tank configured to temporarily store the water from the condenser at a position closer to the condenser than the condensate outlet valve in the condensate line is, and a temporary pure water line connection step of connecting a temporary pure water line to feed the water inside the pure water tank, at a position closer to the condensate pump than the condensate outlet valve in the condensate line, and the blowing-out step includes a blowing-out line setting step of closing the steam stop valve and the condensate outlet valve and opening the bypass valve, a pure water supply step of supplying the pure water inside the pure water tank to the boiler via the temporary pure water line, the condensate pump, and the water supply line, a steam supply step of generating the steam by heating the pure water supplied to the boiler in the pure water supply step inside the boiler, guiding the steam generated in the boiler to the condenser via the main steam line and the bypass line, and converting the steam guided to the condenser to the water inside the condenser, and a blowing water recovery step of feeding the water accumulated inside the condenser in the steam supply step to the blowing water tank.

11. The method for cleaning a steam turbine plant according to claim 10, wherein the preparation step includes a protection plate installation step of providing a turbine protection plate preventing the steam from the bypass line from flowing into the steam turbine, at a position closer to the steam turbine than a position into which the steam from the bypass line flows is, inside the condenser.

12. The method for cleaning a steam turbine plant according to claim 10, wherein the condenser includes a condenser casing into which the steam from the steam turbine and the steam from the bypass line are configured to flow, and a heat transfer pipe group disposed inside the condenser casing and configured to include a plurality of heat transfer pipes configured to condense the steam by exchanging heat between the steam flowing into the condenser casing and a cooling medium, and the preparation step includes a protection net installation step of covering at least a side into which the steam from the bypass line flows with a heat transfer pipe protection net in the heat transfer pipe group.

13. The method for cleaning a steam turbine plant according to any one of claim 10, wherein the blowing-out step further includes a foreign substance detection step of detecting a foreign substance amount contained in the steam flowing from the bypass line into the condenser or a foreign substance amount contained in the water flowing from the condenser into the blowing water tank, and a foreign substance amount determination step of determining whether or not the foreign substance amount is smaller than a predetermined amount, and the blowing-out step is completed on a condition that the foreign substance amount is determined to be smaller than the predetermined amount in the foreign substance amount determination step.

14. The method for cleaning a steam turbine plant according to claim 13, further comprising: after the blowing-out step, a circulation line setting step;

a circulation step; and a water quality detection step, wherein in the circulation line setting step, the steam stop valve is closed, and the bypass valve and the condensate outlet valve are opened, in the circulation step, the water inside the condenser is supplied to the boiler via the condensate line, the condensate outlet valve, the condensate pump, and the water supply line, the water is heated by the boiler to generate the steam, the steam generated in the boiler is guided to the condenser via the main steam line and the bypass line, and the steam guided to the condenser is converted to water inside the condenser, and in the water quality detection step, water quality of the water from the condenser is detected.

15. The method for cleaning a steam turbine plant according to claim 14, further comprising:

a water supply blow step of blowing the water flowing through the water supply line to a wastewater treatment apparatus configured to purify the water, when the water quality detected in the water quality detection step is equal to or higher than a predetermined contamination degree, wherein when the water quality detected in the water quality detection step is lower than the predetermined contamination degree during the circulation step, the circulation step and the water supply blow step are completed.

* * * * *